INVENTOR
NATHANIEL C. WYETH

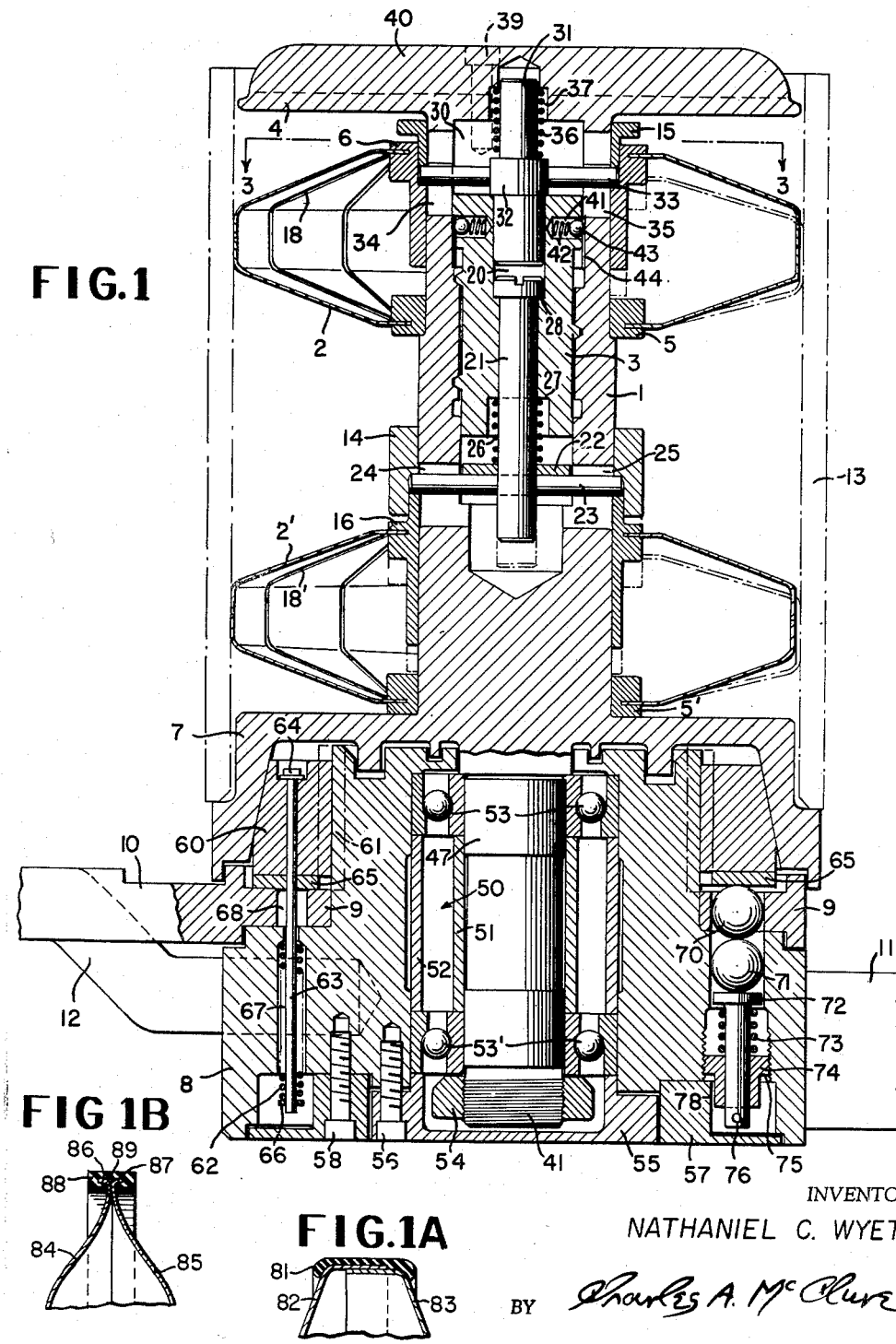
June 21, 1960 — N. C. WYETH — 2,941,735
BOBBIN CHUCK
Filed Dec. 13, 1955 — 2 Sheets-Sheet 1
INVENTOR
NATHANIEL C. WYETH
BY Charles A. McClure
ATTORNEY June 21, 1960   N. C. WYETH   2,941,735
BOBBIN CHUCK Filed Dec. 13, 1955   2 Sheets-Sheet 2

BY Charles A. McClure

ATTORNEY

United States Patent Office 2,941,735
Patented June 21, 1960

2,941,735
BOBBIN CHUCK

Nathaniel C. Wyeth, Hockessin, Del., assignor to E. I. du Pont de Nemours and Company, Wilmington, Del., a corporation of Delaware Filed Dec. 13, 1955, Ser. No. 552,932

7 Claims. (Cl. 242—46.2)

This invention relates to means for supporting a tube for rotation, particularly concerning a chuck for carrying textile bobbins at high rotational speeds.

Increased production and processing speeds employed in yarn manufacture nowadays make severe demands upon winding equipment; for successful operation, chucks upon which bobbins or other yarn-holding tubes are mounted must retain their grip despite unusual forces that accompany very rapid rotation. Conventional chucks have proved inadequate in the range of increased speeds, usually because of poor dynamic balance, a defect conducive to pronounced vibration and failure of bearings and other elements during prolonged operation, with consequent destruction of bobbins, loss of production, and hazard to operating personnel.

A primary object of the present invention is construction of a bobbin chuck useful at extreme rotational speeds. Another object is provision of a bobbin chuck of improved dynamic balance. Other objects of this invention, together with means and methods for attaining the various objects, will be apparent from the following description and the accompanying diagrams.

Figure 4:
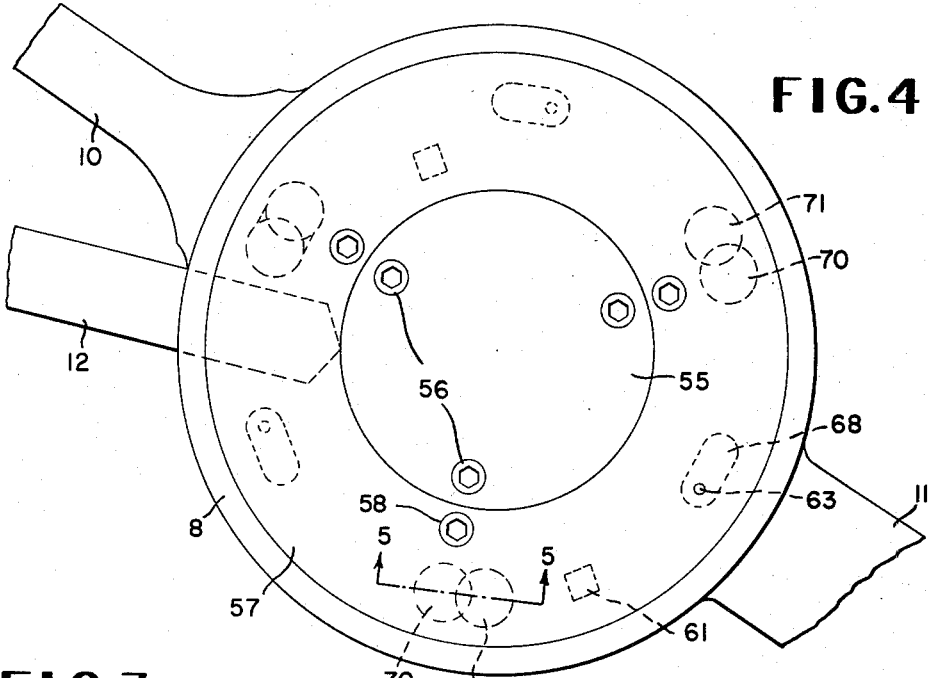
Figure 3:
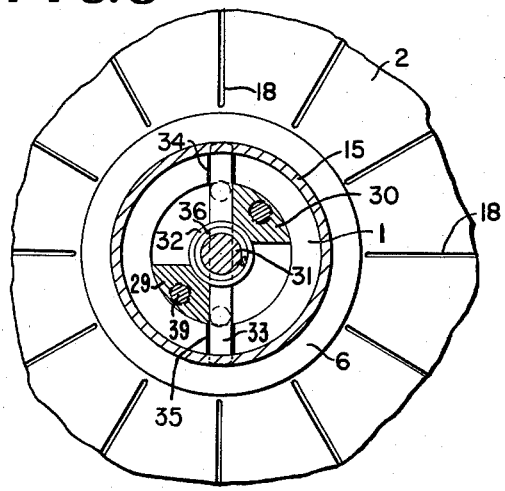
Figure 2:
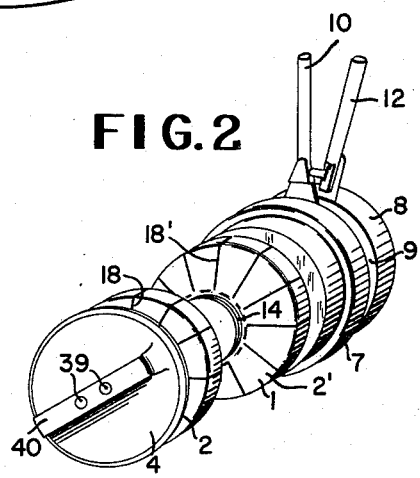
Figure 5:
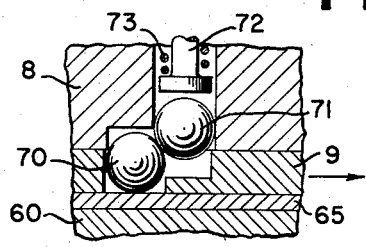

Figure 1 is a longitudinal or axial section of a bobbin chuck of this invention with a bobbin. Figures 1A and 1B are similar sections of alternative constructions of a portion of the apparatus of Figure 1. Figure 2 is a perspective view of the same chuck with bobbin removed. Figure 3 is a transverse or radial section of the chuck on 3—3 of Figure 1. Figure 4 is an end view of the chuck and the bobbin of Figure 1, showing the opposite end to that visible in Figure 2. Figure 5 is a fragmentary sectional view of the chuck at 5—5 of Figure 4.

In general, the objects of the present invention are accomplished by providing as bobbin-gripping means of a chuck mechanism a plurality of annular bellows of substantially trapezoidal cross section with narrow top, wider base, and uniformly sloping sides carried concentric with the axis of rotation on a rotatable spindle with both their tops located equidistant but farther than their bases from the axis and having one of the sides of each bellows movable longitudinally with respect to the spindle so as to vary the base length and the height of the trapezoid and, consequently, the furthermost radial extent of the bellows tops. The invention comprehends a bobbin chuck comprising a spindle having one end supported by bearings for rotation about its axis and having the opposite end including a sleeve with longitudinal slots through its opposite sides at at least two locations along its length and a hollow shaft threaded into the sleeve and having protruding from each end a slidable bolt holding radial pins at locations outside the shaft, and a pair of identical annular bellows of substantially trapezoidal cross section whose base dimension is adjustable, one edge of each of the bellows being affixed to the sleeve and the other edge being affixed to retaining rings slidable longitudinally against the outer surface of the sleeve and connected to the shaft by the pins protruding from the bolts in the shaft and through the slots in the sleeve. Details of construction of a bobbin chuck of this invention, including braking mechanism, are shown in the drawings. Reference terms "near" and "far" indicate relative distance along the longitudinal axis with respect to the location of an observer viewing Figure 2.

Figure 1 shows a longitudinal section taken along the axis of the chuck embodiment appearing in perspective on much smaller scale in Figure 2, which itself shows spindle 1 surrounded by like near bellows 2 and far bellows 2', both located between cap 4 at one end of the spindle and spindle flange 7. The external part of the spindle flange is separated from housing 8 by brake ring 9, which has affixed to it movable brake handle 10; fixed brake handle 12 extends from the housing itself at an acute angle to the movable handle. Also visible, between the bellows, is retaining band 14 surrounding the spindle; hidden in Figure 2 is support arm 11, which extends from the housing.

Figure 1, which shows the chuck with axis upright for convenience although the customary use position will be substantially horizontal, also includes (in section) bobbin 13, which fits over the bellows to surround the spindle from the notch or step visible on the outside of the flange beyond the near end to midway of the edge of the cap. Each of the bellows, both of which are identical, has three main surfaces: a top, which is furthermost from the spindle axis and parallel to it; a substantially straight far side joined at an obtuse angle to the top and terminating in a ringed retainer (5 for the near bellows and 5' for the far bellows, both retainers being identical) affixed to the spindle; and a near side, like the far side, but extending in the opposite direction from the top to terminate in a wider retainer (6 for the near bellows and 16 for the far) movable longitudinally along the spindle surface, as suggested by the alternative position for both bellows indicated in broken lines at the right side of the diagram. Angled slightly near the base for more convenient assembly into the retainers (in retaining slots perpendicular to the spindle axis) the essentially straight sides give the bellows a transverse section in the shape of a trapezoid (closed at the bottom by the spindle itself); hence, the reference herein to "annular bellows of substantially trapezoidal cross section." Of course, variation in the base length of the trapezoid changes the angles of the sides and alters the distance of the bellows tops from the axis of the spindle, hence the presence of slits 18 (and 18') in the top and sides of the bellows to accommodate corresponding expansion and contraction.

The near end of the spindle (toward the top in Figure 1) is hollowed out for a good deal of its length to render it sleeve-like; internally threaded, the spindle sleeve receives and retains threaded spindle shaft 3, also hollow. Bolt 21 retained by step 28 about midway of the sleeve bore 20, in which it is movably located, extends from the far end of the shaft to terminate near the closed end of the spindle sleeve. The bolt carries removable collar 22 whose far side is urged by compression spring 26, which seats in a recess 27 in the far end of the sleeve, against pin 23. The pin passes radially through the bolt and extends through slots 24 and 25 of the sleeve to terminate at each end against the near edge of movable near retainer 16 for the far bellows. Retaining band 14, which moves with the retainer, covers the slots and fits against the ends of the pin to prevent dislocation of the pin or entry of foreign matter into the sleeve. At the near end of the shaft, boss 32 of bolt 31, also movably located in the shaft bore, receives radial pin 33, which extends outward through slots 34 and 35 of the sleeve to terminate at each end against movable near retainer 6 for the near bellows. Compression spring 36 seats at one end against this boss and at the other in recess 37 (in cap 4) in which the bolt terminates; the cap is held onto the end of the shaft by screws 39, one being shown in broken lines. Retaining band 15 covers the slots and fits against the ends of the pin.

Figure 3 taken along 3—3 of Figure 1 shows the transverse appearance of the chuck viewed from the near end just underneath the cap; the shaft end, band 15, bolt 31, and screws 39 appear in section. Upper left and lower right sectors of the shaft are open to allow rotation of the shaft without interference from pin 33; for convenience these sectors are considered to be quadrants, although as is apparent each of them exceeds an exact quadrant by the width of the pin. Remaining projecting wings 30 and 29 (at the upper right and lower left, respectively) of the shaft receives screws 39. The pin is visible extending through boss 32 of the bolt into slots 34 and 35 in spindle sleeve 1 at a location ahead of the body of spindle shaft 3 and terminating at the junction of retainer 6 and band 15. Readily apparent in bellows 2 are the slits that facilitate changes in the bellows dimensions upon movement of the retainer, as when the spindle shaft rotates in the sleeve. Rotation is accomplished manually by holding grip 40 of cap 4 and turning the cap and attached spindle shaft.

One-quarter rotation of the shaft clockwise advances it inside the sleeve and presses the compression springs against the pin-holding elements. Resulting movement of the pins slides the movable retainers equal distances along the surface of the sleeve to displace the near edges of the bellows so as to increase their radial extent whereupon the outermost surface moves into gripping position with respect to the inside wall of a bobbin in place on the chuck. The shaft has opposed blind radial bores 41 extending from its outside to accommodate telltale balls 43 resting upon compression springs 42 seated in the bottom of the bores. At two positions one-quarter turn apart in the relative orientation of shaft and sleeve, the balls drop into shallow grooves cut longitudinally in the inside of the sleeve, thus denoting open and closed positions; Figure 1 shows groove 44 for the open or released position of the bellows (i.e., retracted away from the inside wall of the bobbin). The superimposed bobbin is resting freely upon the chuck, the engaged position being indicated only by the dashed-line representation of the bellows at the right side of the diagram. By their natural resilience, the bellows, once engaged against the bobbin, retract to release it whenever the grip is rotated counterclockwise with respect to the spindle sleeve so as to relieve compression of the springs.

Base 47 of the spindle is pressed inside movable inner race member 51 of bearing assembly 50, which also includes outer race member 52 pressed into the housing and sets of balls 53 and 53' crowded in near and far races, respectively. Lock nut 54 threads onto far end 41 of the spindle to abut the inner race member, and central cover 55 attached to the housing by screws 56 prevents entry of foreign matter into the bearing assembly. Ring-shaped cover 57 affixed to the housing by screws 58 surrounds the central cover and conceals the accessible portions of the braking mechanism.

Brake shoe 60 located inside spindle flange 7 is held non-rotatively but without restriction upon longitudinal movement with respect to the housing by keys 61 and is urged away from the flange by compression spring 62 surrounding rod 63, which passes from nut 64 through aperture 68 in the brake shoe, adjacent insert 65, brake ring 9, and bore 67 in the housing to anchor in cleat 66 affixed to the wall of the housing. As shown at the right of Figure 1, in which the brake is in the "on" position, the insert on the brake shoe has ball 70 pressed against it by ball 71, which also contacts flat headed rod 72; the back of the rod head constitutes a seat for compression spring 73, which urges the rod forward from plug 74 threaded into bore 75 provided in the housing. The plug has a rectangular head of dimensions such that when cover ring 57 is in place the plug engages it at edge 78 and thus cannot turn. The rod passes centrally through the plug and is retained at the far end by cotter pin 76 extending through the end of the rod; in this drawing, the cotter pin is not seating against the plug because the brake is on and the spring is under compression.

Figure 5, taken as indicated on Figure 4, shows the relative location of the balls in the "off" position of the brake. When the brake is applied by squeezing movable handle 10 toward fixed handle 12, brake ring 9 slides about the housing as indicated by the arrow, forcing ball 70 to ride over ball 71 and against insert 65 to wedge the brake shoe against the spindle flange. The brake pressure that the operator can apply in this manner is limited by spring 73, for too rapid deceleration from operating speed (e.g., 12,000 r.p.m.) is conducive to sloughing of yarn carried on the mounted bobbin.

In the customary sequence of operations, an operator places a bobbin onto an unlocked and empty chuck as described until the bobbin base fits against the external step in the spindle flange. Then the operator grips the brake handles with one hand to prevent the chuck from turning and with the other hand grips the cap and gives it a quarter turn clockwise, stopping at the telltale click; this rotation moves the spindle shaft farther into the spindle sleeve and heightens the bellows so that their tops press firmly against the inside wall of the bobbin. As the brake-release spring keeps the brake off in the absence of pressure on the handles, the bobbin is ready for rotation and string-up upon being locked in position; surface-driving of the bobbin is customary, with the yarn being wound onto it being traversed back and forth along the surface, as by a grooved traverse roll or by separate traversing mechanism. When the bobbin is full, the operator squeezes the brake handles to bring the bobbin to a halt and permit its removal from the chuck. After rotating the cap one-quarter turn counterclockwise until each telltale ball engages the other groove, the operator simply slides the bobbin off the then disengaged bellows.

The chuck of the present invention has proved suitable for winding bobbins holding several pounds of yarn at rotational speeds on the order of $10^4$ revolutions per minute, corresponding to winding rates of several thousand yards per minute. Many other means of gripping the bobbin were considered during development of this chuck and found so inferior as to be unsatisfactory. In addition to the primary benefit of utility for high-speed operation, which is attributable at least in part to superior dynamic balance because of the axial symmetry and relatively fixed radial location of the constituent metal parts, this chuck has the advantage of requiring no unusual materials of construction readily available metals being suitable for the various parts in conformity with obvious structural requirements.

A suitable bellows material is 30-gauge (0.010 inch) beryllium copper, heat-treated to hardness C 30-35. The outside of the bellows tops may be finished for maximum frictional coefficient, or a thin boot of neoprene or other elastomeric material may be fitted about each bellows to prevent slippage upon rapid change in rotational velocity, as during braking. Of course, for easy shaping and slitting, bellows may be made in two or more pieces suitably joined, as by lapping and soldering. Figure 1A shows in section a two-piece bellows in which side halves 82 and 83 are lapped so that the former overlies the latter throughout the top surface of the trapezoidal bellows so formed, which itself is covered by resilient boot 81 to provide a non-metallic bobbin-engaging surface.

An alternative bellows construction appears in Figure 1B, in which halves 84 and 85 meet midway of the top surface and turn outward parallel to that surface and to the axis as flaps 86 and 87, shown covered and held against one another by rubbery boot 88, which has T- slot 89 into which the metal flaps snap for a close secure fit. The boot, which provides a resilient bobbin-engaging surface, can be supplemented in its role of holding the metal sides of the bellows together by bolts, welding, solder, or resinous adhesive at the juncture of the metal sides. This modification of the bobbin-supporting portion of the present apparatus is also essentially trapezoidal, having a flat top bobbin-engaging surface (provided by the annular boot) that is, however, narrower than the base where the innermost edges of the sides of the bellows are mounted. Of course, as shown the bellows sides themselves curve inward to form a triangular configuration, which provides a convenient central support for the boot, but the principle of operation remains the same. Other substantially trapezoidal configurations can be substituted with like effect.

Moreover, other of the elements, such as the retaining rings, may be fabricated in multiple pieces and assembled in any conventional manner to reduce the cost or attain like objectives. Conversely, elements may be consolidated; for example, the bolts slidable in the bore of the spindle shaft may be joined end-to-end, with incidental elimination of the near spring. A cam surface may replace the external thread of the rotatable shaft, with suitable enlargement of the internal thread of the sleeve to provide a mating groove. Although the above description is directed toward the use of two bellows on each chuck, it is clear that additional bellows may be added for winding of either a single bobbin or, alternatively, multiple bobbins simultaneously.

The claimed invention:

1. Bobbin chuck comprising a spindle having one end supported by bearings for rotation about its axis and having at the opposite end an integral sleeve having longitudinal slots through opposite sides at two locations along its length, a hollow shaft threaded into the sleeve and having protruding from each end a slidable bolt holding radial pins at locations outside the shaft, and a pair of expansible bellows of substantially trapezoidal cross section whose base dimension is adjustable, one edge of each of the bellows being affixed to the sleeve and the other edge being affixed to retaining rings slidable longitudinally against the outer surface of the sleeve and connected to the shaft by the pins protruding from the bolts in the shaft and through the slots in the sleeve.

2. The apparatus of claim 1 in which top and sides of the bellows are slitted in order to facilitate change in dimensions of the bellows with change in their base length.

3. The apparatus of claim 1 in which a flange extending from the base of the spindle slightly farther than the furthermost extent of the bellows constitutes a seat for the bobbin on the outside and a braking surface on the inside.

4. The apparatus of claim 1 in which the top or outermost surface of the bellows is covered by a resilient boot.

5. Bobbin chuck comprising a spindle having one end supported by bearings for rotation about its axis and having at the opposite end an integral sleeve having longitudinal slots through opposite sides at two locations along its length, a hollow shaft threaded into the sleeve and having protruding from each end a slidable bolt holding radial pins at locations outside the shaft, and a pair of expansible bellows having a base of adjustable dimensions and sloping sides so that adjustment of the base to a narrower dimension causes an increase in the height of the bellows, one edge of each of the bellows being affixed to the sleeve and the other edge being affixed to retaining rings slidable longitudinally against the outer surface of the sleeve and connected to the shaft by the pins protruding from the bolts in the shaft and through the slots in the sleeve.

6. Bobbin chuck comprising a spindle having one end supported by bearings for rotation about its axis and having at the opposite end an integral sleeve having longitudinal slots through opposite sides at two locations along its length, a hollow shaft threaded into the sleeve and having protruding from each end a slidable bolt holding radial pins at locations outside the shaft, and a pair of expansible bellows having a base of adjustable dimensions, a top comprising a resilient slotted boot, the sides of the bellows terminating in the form of flaps fitting in the slot of the boot and sloping so that adjustment of the base to a narrower dimension causes an increase in the height of the bellows, one edge of each of the bellows being affixed to the sleeve and the other edge being affixed to retaining rings slidable longitudinally against the outer surface of the sleeve and connected to the shaft by the pins protruding from the bolts in the shaft and through the slots in the sleeve.

7. In a bobbin chuck including a rotatable spindle, the improvement comprising bobbin-gripping means consisting of a plurality of annular bellows having a radial cross section of substantially trapezoidal form carried on the spindle concentric with the axis of rotation with both their tops located equidistant but farther than their bases from the spindle axis and having at least one of the sides of each bellows mounted for simultaneous longitudinal movement independent of the other side of the bellows with respect to the spindle so as to vary the trapezoidal base length and height and, consequently, the furthermost radial extent of the bellops top, a retaining ring mounted on the spindle and slidable longitudinally with respect to the spindle, one side of each bellows being affixed with respect to the spindle and the other side being attached to said retaining ring, a shaft received into a bore in the spindle, a pin in contact with the retaining ring and extended through openings in the spindle and movable therein by adjustment of said shaft holding the pin and protruding from the spindle, said spindle being slotted longitudinally on opposite sides, the shaft being threaded concentrically into the spindle for restricted relative rotation and having an axial bore, and a bolt restrained slidably in said axial bore and holding the pin slidably in the slotted openings in the spindle to slide the contacting bellows-retaining ring along the spindle.

References Cited in the file of this patent

UNITED STATES PATENTS

| 239,518 | Le Roy | Mar. 29, 1881 |
| 1,478,789 | Magrath | Dec. 25, 1923 |
| 1,558,561 | Mosberg | Oct. 27, 1925 |
| 1,967,763 | Brock | July 24, 1934 |
| 2,636,696 | McBride | Apr. 28, 1953 |

FOREIGN PATENTS

| 261,853 | Great Britain | Dec. 7, 1926 |
| 935,705 | France | Feb. 9, 1948 |